United States Patent [19]

Huxley

[11] 3,928,385

[45] Dec. 23, 1975

[54] CONVERSION OF SULFOLENE TO SULFOLANE IN THE PRESENCE OF A TERTIARY AMINE

[75] Inventor: Edward E. Huxley, Fritch, Tex.

[73] Assignee: Phillips Petroleum Company, Bartlesville, Okla.

[22] Filed: Oct. 15, 1973

[21] Appl. No.: 406,481

[52] U.S. Cl. ............................................. 260/332.1
[51] Int. Cl.$^2$ ....................................... C07D 333/48
[58] Field of Search ................................. 260/332.1

[56] References Cited
UNITED STATES PATENTS

| | | | |
|---|---|---|---|
| 2,391,331 | 12/1945 | Morris et al. | 260/329 |
| 2,451,298 | 10/1948 | Morris et al. | 260/329 |
| 3,530,147 | 9/1970 | Campen et al. | 260/332.1 |
| 3,770,772 | 11/1973 | Kroll | 260/332.1 |

OTHER PUBLICATIONS

Sapozhnikova, et al., Katal. Perarab, Uglevodorodn., Syriya 1970, No. 4, 115–119., Cited as C.A. 76:59340h (1972).

*Primary Examiner*—Henry R. Jiles
*Assistant Examiner*—C. M. S. Jaisle

[57] ABSTRACT

A sulfolene compound is hydrogenated to the corresponding sulfolane compound in the presence of a suitable hydrogenation catalyst and a tertiary amine.

8 Claims, No Drawings

CONVERSION OF SULFOLENE TO SULFOLANE IN THE PRESENCE OF A TERTIARY AMINE

This invention relates to the hydrogenation of a sulfolene compound to the corresponding sulfolane compound.

Sulfolane compounds are useful for a variety of purposes, such as in pesticidal compositions, intermediates in the production of other organic chemicals, selective solvents to separate aromatic hydrocarbons from petroleum fractions, and the like. The sulfolane compounds are generally prepared by the catalytic hydrogenation of the corresponding sulfolene compounds. These sulfolene compounds are generally unstable and tend to decompose at mildly elevated temperatures into an unsaturated organic compound and sulfur dioxide. when these sulfolenes are use to prepare the corresponding sulfolanes by hydrogenation, the initiation of the reaction may increase the temperature enough to result in some decomposition of the sulfolene with subsequent polymerization of some of the decomposition products. This resulting polymer coats the catalyst and significantly reduces the activity thereof.

Accordingly it is an object of the present invention to provide a new and improved process for the hydrogenation of sulfolene compounds to the corresponding sulfolane compounds. Another object of the invention is to minimize the formation of polymer during the hydrogenation of sulfolene compounds to the corresponding sulfolane compounds. Yet another object of the invention is to increase the life of the catalyst employed in the hydrogenation of sulfolene compounds to sulfolane compounds. Still another object of the invention is to provide a higher yield of the desired product. Another object is to provide a colorless sulfolane product.

Other objects, aspects and advantages of the invention will be apparent from a study of the specification and the appended claims to the invention.

U.S. Pat. No. 2,451,298 (1948) suggests the inclusion of a basic-acting material in the catalytic hydrogenation of sulfolene compounds to the corresponding sulfolane compounds, for the purpose of improving the life of the catalyst. The patentees propose the use of any alkali metal or alkali earth metal hydroxide, carbonate or bicarbonate, any alkali metal alcoholate, or any organic amine as the basic-acting material. The only specific organic amine listed is isopropyl amine. However, the only basic-acting material utilized in the working examples is sodium hydroxide. It has now been discovered that amines in general are not suitable for the purpose of protecting the catalyst. Moreover, the utilization of various amines does not avoid the formation of polymer during the hydrogenation reaction. I have discovered that the life of the hydrogenation catalyst can be improved and polymerization avoided during the hydrogenation of the sulfolene compound by admixing a tertiary amine with the sulfolene compound before contacting the sulfolene compound with the hydrogenation catalyst.

The term "sulfolene compound" as employed herein defines generically the unsubstituted and substituted unsaturated compounds comprising or containing a sulfolene nucleus, i.e., a five-membered ring of four carbon atoms and a sulfur atom with a single olefinic linkage between two adjacent carbon atoms of said ring, and two oxygen atoms each of which is directly attached to said sulfur atom. Thus, the generic term "a sulfolene compound" covers the unsubstituted and substituted sulfolenes, viz., the 3-sulfolenes having the general structure

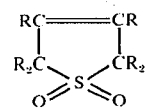

and the 2-sulfolenes having the structure

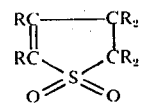

wherein each R is individually selected from the group consisting of hydrogen, hydrocarbon radicals, heterocyclic radicals, and inorganic radicals and combinations thereof which do not interfere with the hydrogenation reaction. Those compounds wherein each R is individually selected from the group consisting of hydrogen and hydrocarbon radicals having one to eight carbon atoms are presently preferred. Suitable hydrocarbon radicals include alkyl, aryl, cycloalkyl, and combinations thereof.

The following representative sulfolene compounds are suggested to those skilled in the art as being operable in this invention: 3-sulfolene, 2-sulfolene, 3-methyl-2-sulfolene, 2-methyl-3-sulfolene, 3-methyl-3-sulfolene, 2,4-dimethyl-2-sulfolene, 2,4-dimethyl-3sulfolene, 3-ethyl-3-sulfolene, and their homologues, as well as other sulfolene compounds, and admixtures thereof.

Similarly, the term "sulfolane compound" as used herein refers to a hydrogenated sulfolene compound, which may be either substituted or unsubstituted. The structure formula of the sulfolane compounds therefore, is

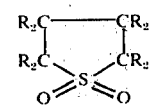

wherein R is as defined hereinabove, with at least one R on each of two adjacent carbon atoms being hydrogen.

The tertiary amines proposed for utilization in the process of the invention include the monoamines having the formula $NR_3'$, the diamines having the formula $R_2'N—R''—NR_2'$ or the formula

triamines, and tetramines such as hexamethylenetetramine, wherein each R' is individually selected from the group consisting of monovalent hydrocarbyl radicals having one to 12 carbon atoms, each R'' is individually selected from the group consisting of divalent hydrocarbyl radicals having one to 12 carbon atoms, the total number of carbon atoms in the amine being in the range of three to 30, perferably in the range of six to 12. Specific examples include trimethylamine, triisobutylamine, N-methyldiethylamine, tridodecylamine, N-methyl-N-ethylpropylamine, N,N-dimethylbutylamine, N-ethyldipropylamine, triphenylamine, tribenzylamine, tri-p-tolylamine, tricyclohexylamine, N,N,N',N'-tetramethylethylenediamine, triethylenediamine, etc., and mixtures thereof.

Hexamethylenetetramine, the presently preferred tertiary amine, is a colorless, odorless and crystalline compound with the formula $(CH_2)_6N_4$ and the structural formula of:

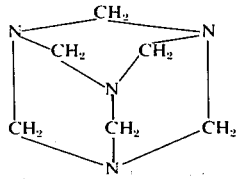

Hexamethylenetetramine is also known by the following: 1,3,5,7-tetra-azatricyclo [3.3.1.1$^{3,7}$] decane; methenamine; hexamethyleneamine; hexamine; formin; aminoform and urotropin. It is soluble in water, chloroform, methyl alcohol and ethyl alcohol.

The tertiary amine will generally be employed in an amount in the range of from about 0.05 to about 2 weight percent based on the sulfolene compound to be hydrogenated. It is desirable that the tertiary amine be admixed with the sulfolene feed prior to contacting the feed with the catalyst.

The catalytic hydrogenation is preferably carried out with the sulfolene compound in the liquid state, for example, by maintaining it above its melting point (but below its thermal decomposition temperature) or in solution in a suitable solvent such as water, benzene, dioxane, alcohols, such as methyl, ethyl, isopropyl or tertiary butyl alcohol, the sulfolane compound itself, and the like. The amount of solvent used can vary and generally will be in the range of about 5 to about 60 weight percent, preferably about 15 to about 40 weight percent of total solvent-sulfolene mixture. The use of a solvent permits better control over the temperature of the rapid and exothermic hydrogenation reaction.

Catalyst which can be used in this invention include any of those known in the art useful in the catalytic hydrogenation of sulfolenes to sulfolanes. A preferred class of hydrogenation catalysts are those which comprise the base metal hydrogenation catalysts, such as those containing or consisting of nickel, cobalt, copper, platinum, palladium or mixtures of these metals with themselves or with other metals such as iron, zinc, chromium, cadmium, etc. These metals may be used in finely divided form such as, for example, Raney nickel or may be suitably supported on a support such as kieselguhr, aluminum oxide, diatomaceous earth and the like.

The reaction temperatures and pressures can vary and be carried out over wide ranges. In fact, any temperature is operable at which the reaction mixture is liquid and which is below that at which the materials decompose. I prefer to operate in the range from about 100° to about 150° F. and at a hydrogen pressure in the range from about 100 to about 300 psig or higher, and requiring from about three to about six hours for the hydrogenation reaction to be completed.

Following completion of the hydrogenation reaction, the sulfolane product can be recovered by conventional procedures. Generally, this comprises first cooling the reaction mixture, venting gages therefrom filtering the cooled reaction mixture to remove the catalyst and fractionating the filtered reaction mixture to remove solvent and unreacted sulfolene compound.

The following examples are presented in further illustration of the invention and should not be construed in undue limitations thereof.

EXAMPLE I

Pure 3-sulfolene was prepared from commercial-grade 3-sulfolene product by crystallization followed by two recrystallizations from water, filtered each time, washed with n-propanol and then washed with methanol and air-dried.

A solution was prepared using 400 grams water and 600 grams of the purified 3-sulfolene. This solution with 2 weight percent Raney nickel based on the 3-sulfolene was placed in a stainless steel one liter reactor and was catalytically hydrogenated with stirring at operating conditions of 100° F. and 200 psig hydrogen pressure with 5 liters hydrogen per minute bleed rate coming out of the reactor. A yield of 98.2 weight percent sulfolane based on the feed 3-sulfolene was obtained after 3 hours reaction time. The reaction effluent containing the sulfolane product was green in color and the effluent contained 24 ppm of a gel-like translucent water insoluble polymer floc. The nickel catalyst settled out as a black metal powder. The reactor effluent was filtered using a Buchner filter, and the solid residue was water washed to remove sulfolane and the green color from the residue. Nickel catalyst and the polymer remained as solids on the filter paper. Methanol was used to dissolve the polymer, and the nickel catalyst stayed on the filter paper. The polymer was recovered from the methanol by evaporation of the methanol. This solid was analyzed by an infrared spectrophotometer and was found to be polysulfone.

One liter of the above filtered sulfolane solution was diluted with 10 liters of anhydrous methanol. A green methanol-insoluble powder was separated from the solution. This green powder was analyzed by infrared spectrophotometer and found to be nickel sulfate.

EXAMPLE II

A solution of 600 grams of pure 3-sulfolene (from batch prepared in Example I), 400 grams water and 0.6 gram of hexamethylenetetramine was prepared. This solution with 2 weight percent Raney nickel based on 3-sulfolene was placed in a stainless steel one liter reactor and was catalytically hydrogenated with stirring at operating conditions of 100°–110° F. and 150 psig hydrogen pressure with 5 liters hydrogen per minute bleed rate coming out of the reactor. A yield of 98.2 weight percent sulfolane based on 3-sulfolene feed was obtained in 6 hours. No green color or polymer formed.

The above test was repeated, except at 200 psig hydrogen pressure with 5 liters hydrogen per minute bleed rate coming out of the reactor. A yield of 99.1 weight percent sulfolane based on 3-sulfolene feed was obtained in 6 hours. No green color or polymer formed.

The above test was repeated, except the temperature was 120°–130° F. and 300 psig hydrogen pressure with 5 liters hydrogen per minute bleed rate coming out of the reactor. Hydrogenation was complete in 3 hours with a yield of 99.3 weight percent sulfolane based on the 3-sulfolene feed. No green color or polymer formed.

EXAMPLE III

A solution of 600 grams of pure 3-sulfolene (from batch prepared in Example I), 400 grams of water and 0.6 grams of methyl amine was prepared. This solution with 2 weight percent Raney nickel based on 3-sulfolene was placed in a stainless steel 1 liter reactor and was catalytically hydrogenated with stirring at operating conditions of about 120° F. and 150 psig hydrogen pressure with 5 liters hydrogen per minute bleed rate coming out of the reactor for the first 15 minutes of the reaction. The reactor temperature began to decrease indicating a decrease in the reaction rate. The hydrogen pressure was increased to 200 psig with 5 liters hydrogen per minute bleed rate coming out of the reactor. The operating temperature was about 100°–110° F. for the remainder of the run. After 4 hours of reaction which includes the first 15 minutes at 150 psig, the yield of sulfolane was 92.7 weight percent based on the 3-sulfolene feed. The reaction effluent was green in color. The nickel catalyst was allowed to settle out of the reaction effluent, and the reaction effluent was filtered to remove the polymer floc from the sulfolane-water solution. The polymer floc was washed, dried and weighed. There was 52 ppm of this water insoluble polymer floc in the sulfolane. The nickel catalyst was examined under the microscope. There was a gel coating on the catalyst surface similar to the polymer floc. The nickel catalyst with the gel coating was inactive.

EXAMPLE IV

A solution of 600 grams of pure 3-sulfolane (from batch prepared in Example I), 400 grams of water and 0.6 grams of methylethylamine was prepared. This solution with 3 weight percent Raney nickel based on 3-sulfolene feed was placed in a stainless steel 1 liter reactor and was catalytically hydrogenated with stirring at operating conditions of a temperature of about 100° to 105° F. and 200 psig hydrogen pressure with 5 liters hydrogen per minute bleed rate coming out of the reactor. The reaction effluent was green in color and contained a gel-like polymer floc. An amine odor was noticeable from the effluent. After 3 hours of reaction time, the yield based on 3-sulfolene feed was 90.3 weight percent.

EXAMPLE V

A solution of 600 grams of pure 3-sulfolene (from batch prepared in Example I), 400 grams of water and 0.6 grams of n-propyl amine was prepared. This solution with 2 weight percent Raney nickel catalyst based on 3-sulfolene feed was placed in a stainless steel one liter reactor and was catalytically hydrogenated with stirring at operating conditions at a temperature of about 100° F., and a hydrogen pressure of 200 psig with 5 liters hydrogen per minute bleed rate coming out of the reactor. The reactor effluent was light green in color and contained 16 ppm polymer floc. No amine odor was detected. After 3 hours of reaction, the yield based on 3-sulfolene was 99.1 weight percent.

EXAMPLE VI

In this example, 10 batches of sulfolane were prepared in a manufacturing plant by the catalytic hydrogenation of 3-sulfolene in the presence of hexamethylenetetramine, according to the practice of this invention. The 3-sulfolene feed used in these batch hydrogenations was prepared by the reaction of 1,3-butadiene and sulfur dioxide. In preparing each batch, a solution of sulfolene and water was prepared and charged to a 1,000 gallon stainless steel clad reactor. About 4,000 pounds of 3-sulfolene and 1,600 pounds of water were in each batch. Three pounds of hexamethylenetetramine was added to each batch. An 80 pound charge of 50 weight percent activated Raney nickel in water was added to each batch at the beginning of the reaction followed by an additional 20 pounds of 50 weight percent activated Raney nickel in water every one to two hours as needed during the hydrogenation reaction. The reactor was pressured to 225 psig with hydrogen with a hydrogen bleed rate of 200–250 cubic feet hydrogen per minute coming out of the reactor, and the temperature maintained at 120°–125° F. The heat of reaction was removed by circulating cooling water in the jacket of the reactor. After the hydrogenation reaction was completed, the reactor effluent was filtered to remove the nickel catalyst, and the filtered reaction mixture was fractionated to remove solvent and unreacted sulfolene. The results of the catalytic hydrogenation of 3-sulfolene with the polymerization inhibitor, hexamethylenetetramine, are given in Table I.

TABLE I

HYDROGENATION OF 3-SULFOLENE IN PRESENCE OF 0.075 WEIGHT PERCENT HEXAMETHYLENETETRAMINE

| Batch | Time Hours | Minutes | Raney Nickel Lbs. | Yield of Sulfolane Wt. % |
|---|---|---|---|---|
| 1 | 7 | 05 | 60 | 98.8 |
| 2 | 6 | 10 | 60 | 99.5 |
| 3 | 6 | 30 | 60 | 99.5 |
| 4 | 6 | 0 | 60 | 97.8 |
| 5 | 7 | 05 | 60 | 93.7 |
| 6 | 7 | 15 | 60 | 95.6 |
| 7 | 5 | 50 | 60 | 98.7 |
| 8 | 5 | 40 | 60 | 99.2 |
| 9 | 6 | 45 | 60 | 98.2 |
| 10 | 7 | 0 | 70 | 99.1 |
| Average per batch | 6 | 32 | 61 | 98.0 |

EXAMPLE VII

In this example, 16 batches of sulfolane were prepared in a manufacturing plant by the catalytic hydrogenation of 3-sulfolene without the addition of a polymerization inhibitor. Each batch was prepared and hydrogenated as reported in Example VI except hexamethylenetetramine was not added to each batch. The results are given in Table II. Comparing data in the two tables, it was noted that the plant was able to decrease the Raney nickel catalyst by 11 pounds per batch from 72 pounds without the hexamethylene-tetramine to 61 pounds with the hexamethylenetetramine, which would amount to a savings of about 33 pounds per day of expensive Raney nickel catalyst. Also, the reaction time was reduced by one hour by adding hexamethylene-tetramine to the 3-sulfolene feed.

TABLE II

HYDROGENATION OF 3-SULFOLENE WITHOUT INHIBITOR

| Batch | Time Hours | Minutes | Raney Nickel Lbs. | Yield of Sulfolane Wt. % |
|---|---|---|---|---|
| 1 | 7 | 40 | 80 | 91.9 |
| 2 | 6 | 25 | 70 | 99.6 |
| 3 | 7 | 20 | 70 | 98.7 |
| 4 | 6 | 35 | 70 | 99.3 |
| 5 | 7 | 05 | 70 | 95.7 |
| 6 | 7 | 35 | 70 | 98.9 |
| 7 | 7 | 10 | 70 | 98.8 |

TABLE II-continued

HYDROGENATION OF 3-SULFOLENE WITHOUT INHIBITOR

| Batch | Time Hours | Minutes | Raney Nickel Lbs. | Yield of Sulfolane Wt. % |
|---|---|---|---|---|
| 8 | 10 | 0 | 80 | 98.6 |
| 9 | 8 | 10 | 70 | 99.5 |
| 10 | 7 | 25 | 75 | 94.8 |
| 11 | 8 | 05 | 70 | 99.8 |
| 12 | 8 | 45 | 70 | 99.2 |
| 13 | 7 | 05 | 70 | — |
| 14 | 7 | 35 | 70 | 92.3 |
| 15 | 7 | 10 | 70 | 98.5 |
| 16 | 7 | 25 | 70 | 99.4 |
| Average per batch | 7 | 35 | 72 | 97.6 |

Examples III, IV and V demonstrate the ineffectiveness of primary and secondary amines in that a polymer floc and a green color was produced in each of these examples as well as in Example I which did not employ an inhibitor. In contrast, the utilization of the tertiary amine in Example II avoided the formation of the polymer floc and the green color. Examples VI and VII demonstrate that the utilization of the tertiary amine provides a reduction in catalyst requirements and in reaction time.

Reasonable variations and modifications are possible within the scope of the foregoing disclosure and the appended claims to the invention.

That which is claimed is:

1. In a process wherein a sulfolene compound is contacted with a hydrogenation catalyst under suitable hydrogenation conditions to convert said sulfolene compound to the corresponding sulfolane compound, the improvement comprising contacting said sulfolene compound with said catalyst in the presence of a hexamethylenetetramine.

2. A process in accordance with claim 1 wherein said sulfolene compound is selected from the group consisting of compounds having one of the formulas

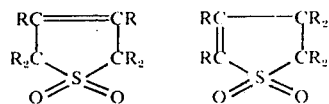

wherein each R is individually selected from the group consisting of hydrogen, hydrocarbon radicals, heterocyclic radicals, inorganic radicals and combinations thereof which do not interfere with the hydrogenation reaction.

3. A process in accordance with claim 2 wherein each R is hydrogen or a hydrocarbyl radical having from one to eight carbon atoms.

4. A process in accordance with claim 2 wherein each R is hydrogen.

5. A process in accordance with claim 2 wherein said hydrogenation conditions comprise a temperature in the range of about 100° F. to about 150° F. and a hydrogen pressure in the range of about 100 to about 300 psig.

6. A process in accordance with claim 2 wherein said catalyst consists essentially of Raney nickel.

7. A process in accordance with claim 6 wherein each R is hydrogen or a hydrocarbyl radical having from one to eight carbon atoms.

8. A process in accordance with claim 6 wherein each R is hydrogen.

* * * * *